US008785553B2

(12) United States Patent
Ouhadi et al.

(10) Patent No.: US 8,785,553 B2
(45) Date of Patent: *Jul. 22, 2014

(54) MOISTURE CURABLE PROPYLENE-α-OLEFIN COPOLYMERS

(75) Inventors: Trazollah Ouhadi, Liège (BE); Jean-Roch H. Schauder, Wavre (BE)

(73) Assignee: ExxonMobil Chemical Patents Inc., Houston, TX (US)

(*) Notice: Subject to any disclaimer, the term of this patent is extended or adjusted under 35 U.S.C. 154(b) by 283 days.

This patent is subject to a terminal disclaimer.

(21) Appl. No.: 11/950,333

(22) Filed: Dec. 4, 2007

(65) Prior Publication Data

US 2009/0143531 A1  Jun. 4, 2009

(51) Int. Cl.
- C08F 8/42 (2006.01)
- C08F 255/04 (2006.01)
- C08F 255/06 (2006.01)
- C09J 151/06 (2006.01)
- C09K 3/24 (2006.01)
- C08L 23/04 (2006.01)

(52) U.S. Cl.
CPC ............... C08F 8/42 (2013.01); C08F 255/06 (2013.01); C08F 255/04 (2013.01); C09J 151/06 (2013.01); C09K 3/24 (2013.01); C08L 23/04 (2013.01)
USPC ..... 525/69; 525/328.8; 525/328.9; 525/330.5

(58) Field of Classification Search
CPC ........ C08F 8/42; C08F 255/06; C08F 255/04; C09K 3/1018; C08J 3/24
USPC ............................ 525/69, 328.8, 328.9, 330.5
See application file for complete search history.

(56) References Cited

U.S. PATENT DOCUMENTS

| 5,604,033 | A | * | 2/1997 | Arthurs et al. ................. 428/350 |
| 5,773,129 | A | * | 6/1998 | Wakamatsu et al. .......... 428/213 |
| 5,844,009 | A | | 12/1998 | Hurley et al. |
| 5,883,145 | A | | 3/1999 | Hurley et al. |
| 6,143,818 | A | * | 11/2000 | Wang et al. .................... 524/528 |
| 6,194,501 | B1 | * | 2/2001 | Okada et al. ................... 524/274 |
| 6,211,300 | B1 | * | 4/2001 | Terano et al. .................. 525/323 |
| 6,448,343 | B1 | * | 9/2002 | Schombourg et al. ........ 525/288 |
| 6,455,637 | B1 | | 9/2002 | Jackson et al. |
| 6,472,015 | B1 | | 10/2002 | Hurley et al. |
| 6,884,850 | B2 | | 4/2005 | Schauder et al. |
| 2002/0151647 | A1 | | 10/2002 | Laughner et al. |
| 2003/0050401 | A1 | | 3/2003 | Jackson et al. |
| 2004/0254302 | A1 | * | 12/2004 | Belforte et al. ................ 525/288 |
| 2006/0211825 | A1 | * | 9/2006 | Schauder et al. .............. 525/285 |
| 2006/0293424 | A1 | * | 12/2006 | Tse et al. ....................... 524/270 |
| 2007/0167553 | A1 | * | 7/2007 | Westwood et al. ............ 524/451 |
| 2008/0023215 | A1 | | 1/2008 | Uehara et al. |

FOREIGN PATENT DOCUMENTS

| EP | 0 510 559 A2 | 10/1992 |
| EP | 2 006 327 | 12/2008 |
| WO | WO 2004/055083 | 7/2004 |
| WO | WO 2005/003199 | 1/2005 |
| WO | WO 2007/008765 | 1/2007 |
| WO | WO 2007/116708 | 10/2007 |

OTHER PUBLICATIONS

Snapshot of Vistamaxx website (2011).*
S. Yang et al., "Mechanism of a One-Step Method for Preparing Silane Grafting and Cross-linking Polypropylene" in 47 Polymer Engineering and Science 1004 (2007).
U.S. Appl. No. 11/810,030 Entitled "Composite Thermoplastic Elastomer Structures with High Adhesion Performance and Uses for the Same" filed Jun. 4, 2007.
C. Jiao et al., "Silane grafting and crosslinking of ethylene-octene copolymer," European Polymer Journal, vol. 41 (2005), pp. 1204-1211.

* cited by examiner

Primary Examiner — Mark Kaucher

(57) ABSTRACT

An aspect of the description is directed to hydrolysable silane graft propylene-α-olefin copolymers useful for moisture curable sealants, the copolymers comprising a propylene-α-olefin copolymer component comprising propylene-derived units and from 5 to 35 wt %, by weight of the propylene-α-olefin copolymer, of ethylene-derived units or a $C_4$ to $C_{10}$ α-olefin-derived unit, and having, in one embodiment, the following features: a density of from 0.850 to 0.920 g/cm$^3$; a MWD of from 1.5 to 20; an $H_f$ of less than or equal to 75 J/g; a $T_m$ of from 25 to 105° C.; and a triad tacticity by $^{13}$C NMR of 75% or greater; and a hydrolysable silane component. The graft copolymer can be combined with oil and/or a thermoplastic to form a graft copolymer composition capable of being cross-linked by exposure to moisture.

14 Claims, No Drawings

US 8,785,553 B2

MOISTURE CURABLE PROPYLENE-α-OLEFIN COPOLYMERS

FIELD OF THE INVENTION

The present invention relates in general to moisture-curable propylene copolymers, and more particularly to hydrolizable silane graft propylene-based polymers and thermoplastic compositions thereof.

BACKGROUND

Clear, moisture curable sealants are useful in many applications. The most widely used clear moisture curable sealants are silicon moisture curable sealants. However, such moisture curable sealants are expensive. Transparent polyurethane sealants exist, but have poor weathering resistance so would not be practical for outdoor use. It would be desirable to make a lower cost moisture curable sealant that is clear and weatherable. Polyolefins offer such a promise, in particular, hydrolizable silane graft polyolefins, as these could potentially be made into compositions that are easily moisture curable and would give very good adhesion to polar substrates including glass.

Silane graft polyethylene-based compositions (having at least 50 wt % ethylene derived units) have been disclosed in EP 0 510 559 A2, WO 2005/003199, U.S. Pat. No. 6,472,015, U.S. Pat. No. 6,455,637, U.S. Pat. No. 5,844,009, U.S. Pat. No. 5,883,145, US Patent Publication 2002/0151647 and US Patent Publication 2003/0050401. One problem with using polyethylene-based polymers in forming graft polymers is that the peroxides that are used to initiate the grafting also act as a cross-linker towards polyethylene themselves. Thus, what results from contacting peroxides with polyethylene-based polymers is a highly cross-linked polymer with higher molecular weight, and thus very high viscosity, specifically in the case where a high silane level (which necessitates the use of high levels of peroxides) is required to get higher performance. Such compositions are not suitable for moisture curable sealants. Further, the cross-linked polyethylene tends to lack clarity due to its crystalline nature.

On the other hand, peroxides tend to act as chain-breaking agents towards polypropylenes. S. Yang et al., "Mechanism of a One-Step Method for Preparing Silane Grafting and Cross-linking Polypropylene" in 47 POLYMER ENGINEERING AND SCIENCE 1004 (2007) teaches the grafting of silane to polypropylene, thus forming moisture cross-linkable propylene homopolymer. However, this article teaches grafting and cross-linking in one step. To be useful as a moisture curable sealant, the graft polymer itself is preferably stable and fluid, or of low viscosity, prior to its application to a surface as a sealant.

The grafting of maleic anhydride to propylene copolymers having high clarity has been disclosed in U.S. Pat. No. 6,884,850 and US 2008-0299397 A1, where it is taught to graft a propylene-ethylene copolymer with ethylenically unsaturated carboxylic acids or acid derivatives or epoxides (e.g., maleic anhydride) by the reaction of the moiety and a peroxide with the polymer. However, such a composition is not moisture cross-linkable, hence, not suitable as a curable sealant.

What would be desirable is a clear, moisture curable sealant (being stable and having a low viscosity prior to curing) comprised mostly of polyolefinic material, thus reducing cost. The inventors have discovered a solution to this problem.

SUMMARY

One aspect of the present invention is directed to hydrolysable silane graft propylene-α-olefin copolymers ("graft copolymer") comprising a propylene-α-olefin copolymer component comprising propylene-derived units and from 5 to 35 wt %, by weight of the propylene-α-olefin copolymer, of ethylene-derived units or a $C_4$ to $C_{10}$ α-olefin-derived unit, and having, in one embodiment, the following features: a density of from 0.850 to 0.920 g/cm$^3$; a MWD of from 1.5 to 20; an $H_f$ of less than or equal to 75 J/g; a $T_m$ of from 25 to 105° C.; and a triad tacticity by $^{13}$C NMR of 75% or greater; and a hydrolysable silane component.

Another aspect of the present invention is directed to a cross-linked propylene-α-olefin copolymer ("cross-linked copolymer") comprising the propylene-α-olefin copolymer component and the hydrolysable silane component, the copolymer and silane having been subjected to the presence of water and, in a preferred embodiment, a condensation catalyst.

Yet another aspect of the present invention is directed to a composition of the graft copolymer and a polyolefin, an oil, a filler, or any combination thereof, thus forming the graft propylene-α-olefin copolymer composition ("graft copolymer composition"). A further aspect of the invention is direct to a composition of the cross-linked copolymer with a polyolefin, an oil, a filler, or any combination thereof, thus forming a crosslinked propylene-α-olefin copolymer composition ("cross-linked copolymer composition").

Insofar as certain numerical ranges of the features of the invention(s) are described, it is understood that any desirable upper limit of that range can be combined with any desirable lower limit of that range, as disclosed herein, to achieve a preferred range.

DETAILED DESCRIPTION

As used herein, "moisture curable sealant" refers to a compound or composition that can be cross-linked as initiated by exposure to liquid or vapor water, and being capable of bonding other surfaces together by surface attachment; and includes compounds or compositions that are used to bond different surfaces (e.g., to bond them together), as well as bond to a surface or surfaces for the purpose of filling a hole or gap in such surface(s).

One aspect of the invention is directed to a hydrolizable silane graft propylene-α-olefin copolymer comprising a propylene-α-olefin copolymer component comprising propylene-derived units and from 5 to 35 wt % (by weight of the propylene-α-olefin copolymer) of ethylene-derived units or a $C_4$ to $C_{10}$ α-olefin-derived unit; and a hydrolysable silane component. It is understood that the "hydrolizable silane graft propylene-α-olefin copolymer" may be claimed such that the characteristics of the propylene-α-olefin copolymer alone—prior to reacting with (grafting to) the hydrolizable silane—are described. In some embodiments, the "hydrolizable silane graft propylene-α-olefin copolymer" may be claimed as the grafting reaction product of the "propylene-α-olefin copolymer" (having certain features as described herein) and a "hydrolizable silane."

The crosslinking of polymers, in particular polyolefins, by the combined process of chemical grafting of silane molecules onto the polymer to form a silane graft resin, followed by catalyzed hydrolysis and condensation of the silane, is known in the art such as is described in U.S. Pat. No. 3,646, 155 and U.S. Pat. No. 6,455,637. The preferred polyolefins for use in forming a graft copolymer are so called "propylene-α-olefin copolymers."

The "propylene-α-olefin copolymers" described herein are copolymers of propylene-derived units and one or more units derived from ethylene or a $C_4$-$C_{10}$ α-olefin and optionally one or more diene-derived units. Preferred α-olefins are ethylene, 1-butene, 1-hexene and 1-octene.

Typical comonomer content of the copolymer is from 5 to 35 wt % in one embodiment. In general, the comonomer content is adjusted so that the copolymer preferably has a MWD (Mw/Mn) of from 1.5 to 20, more preferably from 1.5 to 5, a heat of fusion ($H_f$) less than or equal to 75 J/g and a $T_m$ less than or equal to 105° C. In some embodiments, where more than one comonomer is present, the amount of a particular comonomer may be less than 5 wt %, but the combined comonomer content is preferably greater than 5 wt %.

In such an embodiment, when there is more than one α-olefin-derived unit in the copolymer, the total weight percent of the $C_2$ or $C_4$-$C_{10}$ α-olefin-derived units (or "α-olefin") is preferably from 5 to 35 wt %, more preferably from 7 to 32 wt %, more preferably from 8 to 25 wt %, more preferably from 8 to 20 wt %, and more preferably from 8 to 16 wt %. Particular embodiments of copolymers having more than one α-olefin include propylene-ethylene-octene, propylene-ethylene-hexene and propylene-ethylene-butene polymers. These copolymers may further comprise a diene as described below.

The embodiments described below are discussed with reference to ethylene as a preferred comonomer, but such embodiments are equally applicable with 1-butene, 1-hexene or 1-octene as a comonomer. The propylene-ethylene copolymer described below comprises ethylene, propylene and optionally a diene.

The propylene-ethylene copolymer can comprise from 5 to 25 wt % ethylene-derived units, preferably from 5 to 20 wt %, more preferably from 5 to 16 wt %, and more preferably from 6 to 16 wt % ethylene. In a preferred embodiment, the propylene-ethylene copolymer comprises greater than 11 wt % ethylene. The propylene-ethylene copolymer can comprise from 75 to 95 wt % propylene-derived units, more preferably from 84 to 95 wt %, more preferably from 85 to 95 wt %, and more preferably from 85 to 94 wt % by weight of the copolymer.

The propylene-ethylene copolymer may optionally comprise less than or equal to 10 wt % diene derived units (or "diene"), preferably less than or equal to 5 wt % diene, more preferably less than or equal to 3 wt % diene, preferably from 0.1 to 3 or 4 or 5 or 6 wt %, more preferably from 0.1 to 2 wt %, and more preferably from 0.1 to 1 wt % diene. Suitable dienes useful as co-monomers are, for example: 1,4-hexadiene, 1,6-octadiene, 5-methyl-1,4-hexadiene, 3,7-dimethyl-1,6-octadiene, dicyclopentadiene (DCPD), ethylidiene norbornene (ENB), norbornadiene, 5-vinyl-2-norbornene (VNB), and combinations thereof. The diene, if present, is most preferably ENB.

The propylene-α-olefin copolymer can have a triad tacticity of three propylene units, as measured by $^{13}C$ NMR, of 75% or greater, 80% or greater, 82% or greater, 85% or greater, or 90% or greater. Preferred ranges include from 50 to 99%, more preferably from 60 to 99%, more preferably from 75 to 99% and more preferably from 80 to 99%; and in other embodiments from 60 to 97%. Triad tacticity is determined as follows: The tacticity index, expressed herein as "m/r", is determined by $^{13}C$ nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Embodiments of the propylene-α-olefin copolymer have a tacticity index m/r ranging from a lower limit of 4 or 6 to an upper limit of 8 or 10 or 12.

In a preferred embodiment the propylene-α-olefin copolymer has an $H_f$, determined according to the Differential Scanning Calorimetry (DSC) procedure described herein, greater than or equal to 0.5 or 1 or 5 J/g, and is less than or equal to 80 J/g, preferably less than or equal to 70 J/g, more preferably less than or equal to 50 J/g, more preferably less than or equal to 35 J/g. Stated another way, in one or more embodiments the $H_f$ ranges from a lower limit of 1.0, or 1.5, or 3.0, or 4.0, or 6.0, or 7.0 J/g to an upper limit of 30, or 35, or 40, or 50, or 60 or 70, or 80 J/g.

In a preferred embodiment, the propylene-ethylene copolymer has a percent crystallinity of from 0.5 to 40%, preferably 1 to 30%, and more preferably 5 to 25% wherein "percent crystallinity" is determined according to the DSC procedure described herein. The thermal energy for the highest order of polypropylene is estimated at 189 J/g (i.e., 100% crystallinity is equal to 189 J/g). In another embodiment, the propylene-ethylene copolymer of the present disclosure preferably has a crystallinity of less than 40%, preferably from 0.25 to 25%, more preferably from 0.5 to 22%, and most preferably from 0.5 to 20%.

The procedure for DSC determinations is as follows. About 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (about 23-25° C.) for about 8 days. At the end of this period, an about 15-20 mg disc is removed from the pressed pad using a punch die and is placed in a 10 microliter aluminum sample pan. The sample is placed in a differential scanning calorimeter (Perkin Elmer Pyris 1 Thermal Analysis System) and is cooled to about −100° C. The sample is heated at about 10° C./min to attain a final temperature of about 165° C. The thermal output, recorded as the area under the melting peak of the sample, is a measure of the heat of fusion and can be expressed in Joules per gram (J/g) of polymer and is automatically calculated by the Perkin Elmer System. Under these conditions, the melting profile shows two (2) maxima, the maxima at the highest temperature is taken as the melting point within the range of melting of the sample relative to a baseline measurement for the increasing heat capacity of the polymer as a function of temperature.

In addition to this level of crystallinity, the propylene-ethylene copolymer preferably has a single broad melting transition. The "melting point" ($T_m$) is defined as the temperature of the greatest heat absorption within the range of melting of the sample. However, the propylene-ethylene copolymer may show secondary melting peaks adjacent to the principal peak, but for purposes herein, such secondary melting peaks are considered together as a single melting point, with the highest of these peaks being considered the $T_m$ of the propylene-ethylene copolymer. The propylene-ethylene copolymer preferably has a $T_m$ of from 25 to 105° C., preferably from 25 to 85° C., more preferably from 25 to 75° C., more preferably from 25 to 65° C., more preferably from 30 to 80° C., more preferably from 30 to 70° C. and more preferably from 30 to 60° C.

In a preferred embodiment, the propylene-α-olefin copolymer can have a density of 0.850 to 0.920 g/cm$^3$, more preferably, 0.870 to 0.900 g/cm$^3$, more preferably 0.880 to 0.890 g/cm$^3$ at room temperature as measured per the ASTM D-1505 test method.

In a preferred embodiment, the propylene-α-olefin copolymer can have a melt flow rate (MFR, ASTM D1238, 2.16 kg, 230° C.), equal to or greater than 0.2 dg/min. Preferably, the MFR is from 0.5 to 5000 dg/min and more preferably from 1 to 2500 dg/min. In one embodiment, the propylene-α-olefin copolymer has an MFR of 0.5 to 1500 dg/min, from 2 to 1000 dg/min in another embodiment, and from 5 to 500 dg/min in yet another embodiment, and from 10 to 250 dg/min in yet another embodiment, and from 10 to 100 dg/min in yet another embodiment, and from 2 to 40 dg/min in yet another embodiment, and from 2 to 30 dg/min in yet another embodiment.

Preferred propylene-ethylene copolymers may have a Mooney viscosity [ML (1+4)@125° C.] as determined according to ASTM D1646, of less than 100, more preferably less than 75, even more preferably less than 60, most preferably less than 30.

In one embodiment, the propylene-α-olefin copolymer can have a Mw of 5,000 to 5,000,000 g/mole, more preferably a Mw of 10,000 to 1,000,000, and more preferably a Mw of 50,000 to 400,000. In another embodiment, the propylene-α-olefin copolymer can have a Mn of 2,500 to 2,500,000 g/mole, more preferably a Mn of 10,000 to 250,000, and more preferably a Mn of 25,000 to 200,000. In yet another embodiment, the propylene-α-olefin copolymer can have a Mz of 10,000 to 7,000,000 g/mole, more preferably a Mz of 80,000 to 700,000, and more preferably a Mz of 100,000 to 500,000.

The molecular weight distribution (MWD) of the propylene-ethylene copolymer is from 1.5 to 20 in one embodiment, and from 1.5 to 15 in another embodiment, and more preferably 1.5 to 5, more preferably 1.8 to 5 and most preferably 1.8 to 4 or 3.

Techniques for determining the molecular weight (Mn, Mz and Mw) and molecular weight distribution (MWD) are as follows, and as in Verstate et al. in 21 MACROMOLECULES 3360 (1988). Molecular weight and molecular weight distribution are measured using a Waters 150 gel permeation chromatograph equipped with a Chromatix KMX-6 on-line light scattering photometer. The system is used at 135° C. with 1,2,4-trichlorobenzene as the mobile phase. Showdex (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading are employed; however, data on generally accepted standards, e.g., National Bureau of Standards Polyethylene 1484 and anionically produced hydrogenated polyisoprenes (an alternating ethylenepropylene copolymer) demonstrate that such corrections on Mw/Mn or Mz/Mw are less than 0.05 units. Mw/Mn is calculated from an elution time-molecular weight relationship whereas Mz/Mw is evaluated using the light scattering photometer. The numerical analyses can be performed using the commercially available computer software GPC2, MOLWT2 available from LDC/Milton Roy-Riviera Beach, Fla.

The propylene-α-olefin copolymers can include copolymers prepared according to the procedures in WO 02/36651, U.S. Pat. No. 6,992,158, and/or WO 00/01745. Preferred methods for producing the propylene-α-olefin copolymers are found in US Patent Application Publication 2004/0236042 and U.S. Pat. No. 6,881,800. Preferred propylene-α-olefin copolymers are available commercially under the trade names Vistamaxx™ (ExxonMobil Chemical Company, Houston, Tex., USA) and Versify™ (The Dow Chemical Company, Midland, Mich., USA), certain grades of Tafiner™ XM or Notio™ (Mitsui Company, Japan) or certain grades of Softel™ (Basell Polyolefins of the Netherlands).

To form the graft copolymer, in one embodiment the propylene-α-olefin copolymer as described above is reacted in the molten state with an organic silane having the general formula YSiRR"$_2$, wherein Y is selected from vinyl terminated radicals, each R" is independently selected from hydrolysable organic radicals; and R can be a R" radical, or selected from $C_1$ to $C_{10}$ alkyl radicals (both R and R" are bound to the silicon atom). In a particular embodiment, Y is selected from a vinyl radical, vinyl terminated $C_1$ to $C_{10}$ alkyl radicals. The vinyl terminated radical is preferably selected from vinyl, allyl, butenyl, cyclohexenyl, cyclopentadienyl, and cyclohexadienyl radicals. Examples of the most preferred silanes are vinyltriethoxysilane and vinyltrimethoxysilane.

More particularly, the group R" represents any hydrolysable organic radical, for example an alkoxy radical such as methoxy, ethoxy and butoxy radicals; an acyloxy radical, for example the formyloxy, acetoxy or propionoxy radicals; oximo radicals such as —ON=C(CH$_3$)$_2$, —ON=CCH$_3$ (C$_2$H$_5$) and —ON=C(C$_6$H$_5$)$_2$. Other end-chain unsaturated silanes commercially available such as glycidoxyalkyl-methyl-diethoxysilane or methacryloxyalkyl-trimethoxysilane can be used. Also, 3-Mercapto-alkyltrialkoxysilane can be grafted onto the backbone of the invention in a mechanism involving radical coupling reactions.

In another embodiment, the hydrolysable silane graft propylene-α-olefin is formed by reacting a maleic anhydride (or other suitable anhydride) and a peroxide with the propylene-α-olefin copolymer to form a maleic anhydride graft propylene-α-olefin copolymer (as described in U.S. Pat. No. 6,884,850) followed by contacting the maleic anhydride graft propylene-α-olefin copolymer with an amino-silane to form a silane graft propylene-α-olefin copolymer. The silane component in this embodiment is derived from an amino silane having the following formula: YHN(CH$_2$)$_n$SiRR"$_2$, wherein N is a nitrogen atom, n is from 1 to 20 and wherein Y radical is either hydrogen or one alkyl radical, $C_1$ to $C_{20}$ alkyl radical terminated by —NH$_2$; R" is selected from hydrolysable organic radicals (as elucidated above), and R can be an alkyl group or a R" radical, or selected from $C_1$ to $C_{10}$ alkyl radicals (both R and R" are bound to the silicon atom).

In another embodiment, a propylene-α-olefin with an epoxy functionality can be produced by grafting a molecule containing at least one unsaturation double bond and at least one epoxy functionality, such as glycidyl methacrylate (C$_7$H$_{10}$O$_3$). A propylene-α-olefin with such an epoxy functional group will then react with an amino silane. This can then lead to the moisture curable copolymer as described herein.

In any case, the amount of silane reacted with the propylene-α-olefin depends in part upon the reaction conditions and the degree of modification desired in the propylene-α-olefin. The proportion may vary from 0.03 to 50 wt % based on the total weight of the silane graft copolymer, and from 0.03 to 10 wt % in another embodiment, and from 0.05 to 2.5 wt % in yet another embodiment, and from 0.1 to 4 wt % in yet another embodiment, and from 0.5 to 5 wt % in yet another embodiment.

A free-radical initiator is also combined with the propylene-α-olefin and silane to initiate the graft polymerization reaction. The free-radical initiator can be added at the same time as the silane, or after addition of the silane. Most preferred free-radical initiators are organic peroxides such as benzoyl peroxide, dichlorobenzoyl peroxide, dicumyl peroxide, 2,5-Dimethyl-2,5-di-(tert-butyl-peroxy)-hexyne-(3), 2,5-Dimethyl-2,5-di-(tert-butyl-peroxy)-hexane-(3), di-tertiarybutyl peroxide. The most preferred free-radical initiator for use in the compositions of the present invention is dicumyl peroxide. The criteria for choosing an appropriate free-radical initiator are known to persons skilled in the art and are described in U.S. Pat. No. 3,646,155.

Preferably, the organic peroxide free-radical initiator is added in an amount of from 0.1 to 1.0 wt % of the propylene-α-olefin, more preferably from 0.05 to 0.2 wt %.

The silane and free-radical initiator are reacted with the propylene-α-olefin copolymer and silane above the melting point of the copolymer and/or decomposition temperature of the free-radical initiator under conditions in which the copolymer is subjected to mechanical shearing (melt blending), using processes known to those skilled in the art. In another embodiment, melt blending takes place at from 60 to 200° C. in one embodiment, and from 80 to 180° C. in another embodiment, and from 100 to 175° C. in yet another embodiment, in order to accomplish grafting of the silane onto the propylene-α-olefin The final hydrolysable silane graft propylene-α-olefin copolymer possesses from 0.03 to 4 or 5 or 10 wt % of the hydrolysable silane component in one embodiment, and from 0.05 to 3 wt % in a particular embodiment, and from 0.1 to 1 wt % in yet another particular embodiment, the propylene-α-olefin copolymer component making up the remainder.

The silane graft propylene-α-olefin copolymer is subsequently melt-processed in one embodiment with an amount of one or more silanol condensation catalysts (used to facilitate the cross-linking reaction of the graft copolymer), and optionally with one or more of a number of other additives, such as pigmenting agents, fillers, flame-retardants, antioxidants, stabilizers, processing oils, unmodified thermoplastics, compatibilizers and the like, to form a "composition," as described further below.

The silanol condensation catalyst (or "catalyst") is typically selected from the group consisting of organic bases, carboxylic acids and organometallic compounds including organic titanates and complexes or carboxylates of lead, cobalt, iron, nickel, zinc and tin. Preferably, the catalyst is selected from dibutyltin dilaurate, dibutyltin diacetate, dibutyltin octanoate, dioctyltin maleate, dibutyltin oxide and titanium compounds such as titanium-2-ethylhexoxide. The most preferred silanol condensation catalyst is dibutyltin dilaurate, though any material which will catalyze the silane condensation reaction is suitable for the invention. The condensation catalyst is preferably added in an amount of from 0.01 to 5 wt %, and from 0.01 to 3 wt % in another embodiment, more preferably 0.05 to 2 wt %, and most preferably 0.1 to 1 wt % (by weight of the hydrolizable silane graft propylene-α-olefin copolymer). The condensation catalyst can be added into the propylene-α-olefin copolymer or its blend in pure form, or in a masterbatch with a polymer, or an organic or inorganic filler/carrier.

Subjecting the composition thus produced to moisture, at from 20 to 25° C. in one embodiment, and preferably at an elevated temperature, will induce crosslinking of the silane groups via a combined hydrolysis and condensation reaction. Atmospheric moisture is usually sufficient to permit the crosslinking to occur, but the rate of crosslinking may be increased by the use of an artificially moistened atmosphere, or by immersion in liquid water. Subjecting the composition to combined heat and moisture will accelerate the crosslinking reaction. Most preferably, crosslinking is effected at a temperature above 50° C. and most preferably by exposing the composition to a temperature of 85° C. and a relative humidity of 90% for approximately 100 hours.

The propylene-α-olefin copolymer, silane, free radical initiator and silanol condensation catalyst may be combined in any number of ways and in any order. In one embodiment, the propylene-α-olefin, silane and free-radical initiator are first combined and melt blended at or above the melting point of all of the components, at from 60 to 250° C. in one embodiment, and from 80 to 180° C. in another embodiment, and from 90 to 230° C. in yet another embodiment, and from 100 to 175° C. in yet another embodiment, in order to accomplish grafting of the silane onto the propylene-α-olefin and/or blending the components. Next, the silanol condensation catalyst can be combined with the graft copolymer, forming a graft copolymer composition. In another embodiment, the propylene-α-olefin, silane, free-radical initiator and silanol condensation catalyst are melt blended together in order to accomplish both the grafting of the silane onto the propylene-α-olefin and blending of the components, forming the graft copolymer composition.

As mentioned above, other "additives" (oils, thermoplastics, etc.) may be combined with the graft copolymer to form compositions. In a particular embodiment, the propylene-α-olefin, silane, free-radical initiator, silanol condensation catalyst and additives are reacted by melt blending as described above to form the graft copolymer composition. In one embodiment, the graft copolymer composition can then be passed through a multi-strand die, cooled, and subsequently chopped into pellets with a strand pelletizer and dried. The material so processed can then be exposed to moisture at any time convenient for its use as, for example, a moisture curable sealant, preferably at an elevated temperature, to effect crosslinking of the material. The end result is the cross-linked propylene-α-olefin copolymer composition (or "cross-linked copolymer composition").

In yet another embodiment, the propylene-α-olefin, silane and free-radical initiator are first reacted as described above to produce the graft copolymer, which can then be isolated, pelletized, etc. This graft copolymer can then be separately melt processed by combining the silanol condensation catalyst and additives, combined as mentioned above. This graft copolymer composition can then be exposed to moisture at any time convenient for its use as, for example, a moisture curable sealant, preferably at an elevated temperature, to effect crosslinking of the material. The end result is the cross-linked copolymer composition.

As mentioned above, the graft copolymer may be combined with a thermoplastic, a polyolefin or polyamide in one embodiment. "Polyolefin" can include any known polymer comprising olefin-derived units, and in particular includes propylene homopolymers, propylene random copolymers, propylene impact copolymers, propylene block copolymers, plastomers, high density polyethylenes, linear low density polyethylenes, low density polyethylenes, and combinations thereof. In a further embodiment, the hydrolizable silane graft propylene-α-olefin copolymer may be blended with a processing oil ("oil"). In yet another embodiment, the hydrolizable silane graft propylene-α-olefin copolymer is blended with a filler. In yet another embodiment, the hydrolizable silane graft propylene-α-olefin copolymer may be blended with any combination of a polyolefin, oil, and filler.

In one embodiment, the hydrolizable silane graft propylene-α-olefin copolymer is blended with from 1 to 70 wt % (by weight of the composition) of an oil, and from 5 to 60 wt % in yet another embodiment, and from 10 to 40 wt % in yet another embodiment. In one embodiment, the polyolefin is a propylene homopolymer. "Oils" includes plasticizers, extender oils, synthetic processing oils, or a combination thereof can also be optionally added to the blend. The extender oils can include, but are not limited to, aromatic, naphthenic, and paraffinic extender oils. Exemplary synthetic processing oils are polylinear α-olefins, polybranched α-olefins, and hydrogenated polyalphaolefins. The compositions of this invention can include organic esters, alkyl ethers, or combinations thereof. Synthetic polyalphaolefins are also useful in lowering the glass transition temperature ($T_g$). Commercially available poly-α-olefins that can be useful include Elevast™ A30, and Elevast L30 (ExxonMobil Chemical, Houston). Oligomeric (e.g., Indopol™, BP, Great Britain) and polymeric processing additives can also be used.

In another embodiment, the hydrolizable silane graft propylene-α-olefin copolymer is blended with from 1 or 2 to 60 wt % (by weight of the composition) of a polyolefin, and from 10 to 50 wt % in yet another embodiment. In a preferred embodiment, the polyolefin is a propylene homopolymer or copolymer. In yet another embodiment, the polyolefin is a propylene copolymer comprising from 0.1 to 20 wt % ethylene derived units or a $C_4$ to $C_{10}$ α-olefin derived units, and from 0.1 to 5 wt % in another embodiment. In yet another embodiment, the polypropylene has an MFR (230/2.16) of from 0.1 to 2000 dg/min, and from 0.5 to 200 dg/min in yet another embodiment, and from 1 to 20 dg/min in yet another embodiment, and from 2 to 10 dg/min in yet another embodiment.

In yet another embodiment, the hydrolizable silane graft propylene-α-olefin copolymer is blended with from 1 to 40 wt % of a filler, and from 2 to 30 wt % in another embodiment, and from 3 to 20 wt % in yet another embodiment. Fillers that can be included in the hydrolizable silane graft propylene-α-olefin copolymer composition include those reinforcing and non-reinforcing fillers or extenders that are conventionally employed in the compounding of polymeric materials. Useful fillers include carbon black, calcium carbonate, clays, silica, talc, and titanium dioxide.

Thus, one embodiment of the present invention is a graft copolymer composition—a moisture curable sealant in a particular embodiment—comprising from 5 or 10 or 15 or 20 or 30 or 40 wt % to an upper limit of 75 or 80 or 85 or 90 or 95 wt % (by weight of the composition) of the graft copolymer; and a thermoplastic from a lower limit of 2 or 5 or 6 or 10 or 15 wt % to an upper limit of from 30 or 35 or 40 or 45 or 50 or 50 wt %, where the thermoplastic is preferably a polyolefin, and most preferably a polypropylene; and an oil from a lower limit of 5 or 10 or 15 wt % to an upper limit of from 25 or 30 or 40 or 50 or 60 wt % of the composition. In another embodiment the graft copolymer composition also includes from 0.1 or 0.5 or 0.8 or 1.0 or 1.5 wt % to an upper limit of from 3.5 or 4.0 or 4.5 or 5.0 wt % of a silanol condensation catalyst by weight of the composition. In yet another embodiment, the graft copolymer composition also includes from 1 or 5 or 10 or 15 wt % to an upper limit of from 20 or 25 or 30 or 40 or 50 or 60 wt % of one or more filler(s). Any one of the ranges above may also be a 0.9 or 0.5 or 0.2 fraction thereof in order to make the entire composition comprise a total of 100%.

It is possible to also blend minor components into the hydrolizable silane graft propylene-α-olefin copolymer such as antioxidants, antiozonates, UV stabilizers, slip agents, and other minor additives known in the art.

The graft copolymer compositions may be produced by any number of methods as described herein. One method of forming a silane graft propylene-α-olefin copolymer comprises (a) providing a propylene-α-olefin copolymer comprising propylene-derived units and from 5 to 35 wt %, by weight of the propylene-α-olefin, of ethylene-derived units or a $C_4$ to $C_{20}$ α-olefin-derived unit; (b) reacting a hydrolysable vinyl silane and a free-radical initiator with the propylene-α-olefin copolymer to form a silane graft propylene-α-olefin copolymer; or (c) reacting a maleic anhydride and a free-radical initiator with the propylene-α-olefin copolymer to form a maleic anhydride graft propylene-α-olefin copolymer, followed by contacting the maleic anhydride graft propylene-α-olefin copolymer with an amino-silane or a epoxy-silane to form a silane graft propylene-α-olefin copolymer. In one embodiment, the graft copolymer is further blended with from 0.01 to 5 wt %, based on total weight of final blend, of one or more silanol condensation catalyst(s). In another embodiment, the "reacting" steps of (b) or (c) take place from any temperature at or above the melting point of the graft copolymer, or from 80 or 90 or 95 or 100 to an upper limit of from 150 or 170 or 200 or 230° C. Preferably, the "reacting" steps occur during melt blending of the components, the melt blending taking place by any suitable means known in the art. The free-radical initiator, silane and copolymer can be combined with one another in any order. In one embodiment, the reacting steps of (b) or (c) occur during melt-blending of the components.

To form the cross-linked graft copolymer, the silane graft propylene-α-olefin copolymer is contacted with a silanol condensation catalyst and water/moisture to form a cross-linked silane graft propylene-α-olefin copolymer. In one embodiment, the "contacting" step occurs at from 20 or 25 to an upper limit of from 40 or 50 or 60 or 70 or 85° C.

In certain embodiments, the graft copolymer has a Shore A hardness (ISO 868) of from greater than 40, and from greater than 50 in another embodiment, and greater than 60 in another embodiment, and from 40 to 90 in yet another embodiment, and from 50 to 70 in yet another embodiment.

In another embodiment, the graft copolymer has an Elongation at Break (ISO 37) of from 100 to 1100%, and from 400 to 1100% in another embodiment, and from 500 to 1000% in another embodiment, and greater than 200 in yet another embodiment, and greater than 400 in yet another embodiment, and greater than 500 in yet another embodiment.

In yet another embodiment, the graft copolymer has a Tensile Strength (ISO 37) of from greater than 1 MPa, and from greater than 3 MPa in another embodiment, and from greater than 5 MPa in another embodiment, and greater than 7 MPa in another embodiment, and greater than 10 MPa in yet another embodiment, and from and from 3 to 15 MPa in yet another embodiment, and from 5 to 15 MPa in yet another embodiment, and from 7 to 13 MPa in yet another embodiment.

In yet another embodiment, the graft copolymer has a haze (ASTM D1003) value of from less than 15% in one embodiment, and less than 20% in another embodiment, and less than 25% in yet another embodiment, and from 1 to 25% in yet another embodiment, and from 2 to 20% in yet another embodiment, and from 5 to 20% in yet another embodiment.

In certain embodiments, the cross-linked copolymer composition has a Shore A hardness (ISO 868) of from less than 90, and from less than 80 in another embodiment, and from less than 70 in yet another embodiment, and a range of from 20 to 90 in yet another embodiment, and from 40 to 90 in another embodiment, and from 30 to 80 in yet another embodiment, and from 45 to 70 in yet another embodiment, and from 40 to 60 in yet another embodiment.

In another embodiment, the cross-linked copolymer composition has an Elongation at Break (ISO 37) of from 100 to 900%, and from 400 to 900% in another embodiment, and from 500 to 800% in yet another embodiment, and from greater than 200% in yet another embodiment, and from greater than 400% in yet another embodiment.

In another embodiment, the cross-linked copolymer composition has a Tensile Strength (ISO 37) of from less than 22 MPa, and less than 20 MPa in another embodiment, and less than 18 MPa in yet another embodiment, and greater than 5 MPa in yet another embodiment, and from greater than 7 MPa in yet another embodiment, and from 3 to 20 MPa in yet another embodiment, and from 5 to 20 MPa in yet another embodiment, and from 7 to 15 MPa in yet another embodiment.

In yet another embodiment, the cross-linked copolymer composition has a Compression Set (23° C., 22 hours, 25% compression, ISO 815) of from less than 35, and from 40 in another embodiment, and less than 35 in another embodiment, and less than 30 in yet another embodiment, and from 10 to 40 in yet another embodiment, and from 10 to 35 in yet another embodiment, and from 12 to 32 in yet another embodiment.

As mentioned, the graft copolymer or graft copolymer composition is useful as a moisture curable sealant in one embodiment. Typically, the graft copolymer or graft copolymer composition (optionally including the silanol condensation catalyst) is stored in the absence of moisture until it is ready to be used. It can then be applied, preferably in a paste, gel or liquid form, to a surface or surfaces to be bonded or filled, thus allowing atmospheric moisture to cure the composition and bonding the surfaces and/or sealing the surfaces.

The invention is further illustrated by the following examples:

EXAMPLES

Graft Copolymer. Data for silane graft propylene-α-olefin copolymer samples 1-6 are illustrated as summarized in Table 1. The first sample shows silane grafting of a propylene-α-olefin copolymer (cPP 1) having an MFR (230/2.16) of 3.0 dg/min, 16 wt % ethylene derived units. The second sample shows the silane grafting of a propylene-α-olefin (cPP 2) having MFR 4.1 dg/min, 10.3 wt % ethylene derived units and 2.1 wt % ENB derived units. The vinyl silane is vinyltrimethoxy silane, which includes dicumyl peroxide (DynaSylan™ 13 VTMO, Evonic Industries [formerly Degussa]). DynaSylan 13 is a 91.5/8.5 (wt/wt) blend of dicumyl peroxide and vinyl trimethoxy silane. Note that the 12 (measured according to ASTM D1238, 2.16 kg, 190° C.) advantageously increases (viscosity goes down) as more vinyl-silane and peroxide is added. Mixing conditions for silane grafted propylene-α-olefin blends: the mixer type was a Brabender 50 ml, run at a chamber temperature of 150° C. for a mixing time of 5 min; the chamber loading was 49.5 g. After blends are dumped, they are compressed in a cold press (room temperature) to 2 mm for 2 min.

Cross-Linked Graft Copolymer. Cross-linking experiments of silane grafted propylene-α-olefin copolymer samples A-G are illustrated as summarized in Table 2 and sample V in Table 3. A masterbatch of dibutyltindilaurate (catalyst) was made using 3.465 grams of the dibutyltindilaurate in 51.535 grams Vistamaxx 6102. This catalyst masterbatch was added to a portion of the Sample 3 from the grafting sample (cPP-g (3), containing 1.43 wt % vinyl silane) and Sample 6 from the grafting sample (cPP-g(6) containing 1.33 wt % vinyl silane). This was followed by a cross-linking reaction after an aging of 24 hours in water at 23° C. or at 50° C. These properties, compared with samples without catalysts, show a significant increase of hardness, tensile strength and decrease of compression set (CS). All compositions were mixed in a Brabender (50 ml) at 150° C. chamber temperature. The curing is done by immersing the samples in water at a given temperature and for a given time. Test methods are as follows:

Hardness (23° C.), ISO 868, 15 sec. delay, 2 mm/30 mm (thickness/diameter disk, cold pressed plaque). Measurement was done on stack of 3 disks of 2 mm thickness and 30 mm diameter.

Tensile Strength, (23° C.), ISO 37 (500 mm/min), type 2 dumbbell, 2 mm cold pressed plaque.

Elongation at Break, (23° C.), ISO 37 (500 mm/min), type 2 dumbbell, 2 mm cold pressed plaque.

Modulus at 100% strain, (23° C.), ISO 37 (500 mm/min), type 2 dumbbell, 2 mm cold pressed plaque.

Compression Set ("CS") (on cold pressed plaque; 25% compression; 23° C. and 70° C.), ISO 815, stack of 3 disks 2 mm/12 mm, (thickness/diameter disk).

Cross-Linked Copolymer Compositions. Blends (samples W-X) of polypropylene (Borsoft™ SD233CF, MFR of 7.0 dg/min; Borealis) and process oil (Paralux™ 6001 R, ChevronTexaco Global Lubricants) with grafted propylene-α-olefin Samples 3 and 6 (cPP-g (3) and cPP-g (6)) are illustrated as summarized in Table 3. The W and X samples demonstrate that the silane graft propylene-α-olefin can be used as the rubber phase in a thermoplastic vulcanizate-type composition and cross-linked by exposure to moisture. With good tensile strength and low CS. Due to the ability of the silane graft propylene-α-olefin to absorb and maintain the process oil, product with low hardness (33 Sh A) was obtained using cPP-g (3) and process oil. Test methods are as described above.

Transparency of the graft copolymer. Table 4 presents data indicating the transparency of the graft copolymer and compositions. This is indicated by the level of haze. Haze was measured by the following method: ASTM D1003 on 2 mm ISO plaque (injection molded). Vistamaxx™ and Exact™ were obtained from ExxonMobil Chemical Company, Houston Tex. Exact is an example of an ethylene-based polymer (also referred to as a "plastomer" in the art), comprising from 50 to 99 wt % ethylene derived units and from 1 to 50 wt % of a copolymer (preferably a $C_3$ to $C_{10}$ α-olefin) and having a density of from 0.850 to 0.910 g/cm³.

TABLE 1

Propylene-α-olefin grafting examples

| | 1 | 2 | 3 | 4 | 5 | 6 |
|---|---|---|---|---|---|---|
| Formulation, wt % | | | | | | |
| cPP 1 | 99 | 98 | 97 | — | — | — |
| cPP 2 | — | — | — | 99 | 98 | 97 |

TABLE 1-continued

Propylene-α-olefin grafting examples

| | 1 | 2 | 3 | 4 | 5 | 6 |
|---|---|---|---|---|---|---|
| vinyl silane/peroxide blend | 1 | 2 | 3 | 1 | 2 | 3 |
| Extruder parameters | | | | | | |
| Feed rate, kg/h | 7 | 7 | 7 | 7 | 7 | 7 |
| Screw speed, rpm | 200 | 200 | 200 | 250 | 250 | 250 |
| Zone 1, °C. | 156 | 160 | 160 | 161 | 160 | 155 |
| Zone 2, °C. | 181 | 183 | 183 | 184 | 184 | 184 |
| Zone 3, °C. | 203 | 203 | 202 | 204 | 203 | 205 |
| Zone 4, °C. | 150 | 140 | 140 | 122 | 121 | 120 |
| Die, °C. | 140 | 140 | 140 | 120 | 120 | 120 |
| melt pressure at die (bar) | 60-77 | 50-64 | 39-42 | 105-127 | 83-102 | 75-81 |
| Graft polymer properties | | | | | | |
| $I_2$ (190° C./1.26 kg), dg/min | 2.8 | 6.9 | 16.4 | 1.7 | 3.0 | 6.7 |
| Graft silane, wt % | 0.24 | 0.78 | 1.43 | 0.21 | 0.69 | 1.33 |
| Graft silane, mole % | 0.05 | 0.15 | 0.27 | 0.04 | 0.13 | 0.26 |

TABLE 2

Cross-linked graft propylene-α-olefin examples

| | A | B | C | D | E | F | G |
|---|---|---|---|---|---|---|---|
| Formulation, wt % | | | | | | | |
| cPP-g (3) | 100 | 100 | 99.5 | 99.17 | 98.83 | 98.33 | 98.33 |
| catalyst MB | 0 | 0 | 0.5 | 0.83 | 1.17 | 1.67 | 1.67 |
| Mixing and curing conditions | Mixing: 5 min @ 150° C. Curing: 3 hrs after mixing | Mixing: 5 min @ 150° C. Curing: 3 hrs after mixing | Mixing: 5 min at 150° C. Curing: 24 hrs in H₂O at 23° C. | Mixing: 5 min at 150° C. Curing: 24 hrs in H₂O at 23° C. | Mixing: 5 min at 150° C. Curing: 24 hrs in H₂O at 23° C. | Mixing: 5 min at 150° C. Curing: 24 hrs in H₂O at 23° C. | Mixing: 5 min at 150° C. Curing: 24 hrs in H₂O at 50° C. |
| Parameter | | | | | | | |
| Hardness, Shore A | 48 | 51 | 58 | 60 | 59 | 58 | 59 |
| Tensile Strength, MPa | 4.5 | 5.2 | 10.3 | 10.9 | 10.5 | 8.7 | 8.9 |
| Elongation at Break, % | 1251 | 1333 | 1033 | 1057 | 919 | 946 | 733 |
| Modulus @ 100% Strain, MPa | 1.0 | 1.2 | 1.4 | 1.5 | 1.6 | 1.4 | 1.4 |
| CS at 23° C., % | 43 | 38 | 29 | 33 | 32 | 28 | 27 |
| CS at 70° C., % | melts | melts | 52 | 51 | 51 | 55 | 53 |

TABLE 3

Blends of polypropylene and oil with cross-linked graft propylene-α-olefin

| | V | W | X | Y | Z |
|---|---|---|---|---|---|
| Formulation, wt % | | | | | |
| cPP-g (3) | — | 60 | — | 67 | 67 |
| cPP-g (6) | 99.17 | — | 60 | — | — |
| PP | — | 19.17 | 19.17 | — | — |
| oil | — | 20 | 20 | 30 | 30 |
| catalyst MB | 0.83 | 0.83 | 0.83 | 3.0 | 3.0 |
| Mixing and curing conditions | Mixing: 5 min at 150° C. Curing: 24 hrs in H₂O at 23° C. | Mixing: 5 min at 150° C. Curing: 24 hrs in H₂O at 23° C. | Mixing: 5 min at 150° C. Curing: 24 hrs in H₂O at 23° C. | Mixing: 5 min at 150° C. Curing: 24 hrs in H₂O at 50° C. | Mixing: 5 min at 150° C. Curing: 24 hrs in H₂O at 50° C. |

TABLE 3-continued

Blends of polypropylene and oil with cross-linked graft propylene-α-olefin

| | V | W | X | Y | Z |
|---|---|---|---|---|---|
| | Parameter | | | | |
| Hardness, Shore A or D | 91 A (29 D) | 59 A | 83 A | 33 A | 33 A |
| Tensile Strength, MPa | 22.4 | 6.6 | 8.0 | 4.4 | 4.5 |
| Elongation at Break, % | 815 | 829 | 553 | 996 | 805 |
| Modulus @ 100% Strain, MPa | 3.3 | 1.7 | 3.9 | 0.7 | 0.7 |
| CS at 23° C., % (25% compression) | 35 | 25 | 29 | 32 | 31 |
| CS at 70° C., % (25% compression) | 70 | 54 | 70 | 82 | 82 |

TABLE 4

Haze values

| sample | Haze (%) |
|---|---|
| Vistamaxx ™ 6102 | 6.12 |
| cPP-g (3) | 19.16 |
| cPP-g (6) | 11.21 |
| Exact ™ 5062 | 84.36 |

1. Having described the various aspects of the invention and demonstrated certain of its features, the invention(s) can be described by the numbered embodiments, wherein in a first embodiment, a hydrolizable silane graft propylene-α-olefin copolymer is provided, comprising:
   (a) a propylene-α-olefin copolymer component comprising propylene-derived units and from 5 to 35 wt %, by weight of the propylene-α-olefin copolymer, of ethylene-derived units or a $C_4$ to $C_{10}$ α-olefin-derived unit, and having:
      (i) a density of from 0.850 to 0.920 g/cm$^3$;
      (ii) a MWD of from 1.5 to 20;
      (iii) an $H_f$ of less than or equal to 75 J/g;
      (iv) a $T_m$ of from 25 to 105° C.;
      (v) a triad tacticity by $^{13}$C NMR of 75% or greater; and
   (b) a hydrolysable silane component.
2. The graft copolymer of the first embodiment, wherein the propylene-α-olefin copolymer comprises from 5 to 25 wt % ethylene-derived units.
3. The graft copolymer of the first and second embodiment, wherein the $H_f$ is less than or equal to 60 J/g.
4. The graft copolymer of any of the preceding numbered embodiments, wherein the graft copolymer comprises from 95.0 to 99.97 wt % (by weight of the of the graft copolymer) of propylene-α-olefin copolymer component and from 0.03 to 5 wt % (by weight of the of the graft copolymer) of the hydrolysable silane component.
5. The graft copolymer of any of the preceding numbered embodiments, wherein the propylene-α-olefin copolymer also comprises from 0.1 to 6 wt % diene-derived units.
6. The graft copolymer of any of the preceding numbered embodiments, wherein the silane component is derived from a vinyl silane having the following formula: YSiRR"$_2$, wherein Y is selected from vinyl terminated radicals, each R" is independently selected from hydrolysable organic radicals; and R can be a R" radical, or selected from $C_1$ to $C_{10}$ alkyl radicals (both R and R" are bound to the silicon atom).
7. The graft copolymer of any of the preceding numbered embodiments, wherein the silane component is derived from an amino silane having the following formula: YHN(CH$_2$)$_n$SiRR"$_2$, wherein N is a nitrogen atom, n is from 1 to 20 and wherein Y radical is either hydrogen or one alkyl radical $C_1$ to $C_{20}$ alkyl radical terminated by —NH$_2$; R" is selected from hydrolysable organic radicals, and R can be an alkyl group or a R" radical, or selected from $C_1$ to $C_{10}$ alkyl radicals.
8. The graft copolymer of any of the preceding numbered embodiments, wherein the graft copolymer has a MWD of from 1.8 to 5.
9. The graft copolymer of any of the preceding numbered embodiments, wherein the graft copolymer has a haze value of from less than 25%.
10. The graft copolymer of any of the preceding numbered embodiments, the propylene-α-olefin copolymer has a triad tacticity by $^{13}$C NMR of 80% or greater.
11. The graft copolymer of any of the preceding numbered embodiments, wherein the graft copolymer is a component of a composition including from 0.01 to 5 wt %, based on total weight of final blend, of a silanol condensation catalyst.
12. The graft copolymer of embodiment 11, wherein the graft copolymer is cross-linked to form a cross-linked propylene-α-olefin copolymer.
13. The graft copolymer of embodiment 12, wherein the graft copolymer is a component of a composition including from 2 to 50 wt % polypropylene to form a cross-linked copolymer composition.
14. The graft copolymer of embodiment 13, wherein the graft copolymer is a component of a composition including from 5 to 60 wt % oil to form a cross-linked copolymer composition.
15. The graft copolymer of embodiment 12, wherein the cross-linked copolymer has a Shore A hardness (ISO 868) of from greater than 40.
16. The graft copolymer of embodiments 12 and 15, wherein the cross-linked copolymer has a Shore A hardness (ISO 868) of from 40 to 90.
17. The graft copolymer of embodiments 12 and 15-16, wherein the cross-linked copolymer has an Elongation at Break (ISO 37) of from 100 to 1100.
18. The graft copolymer of embodiments 12 and 15-17, wherein the cross-linked copolymer has a Tensile Strength (ISO 37) of from greater than 3 MPa.
19. The graft copolymer of embodiments 12 and 15-18, wherein the cross-linked copolymer has a Compression Set (23° C., 22 hours, 25% compression, ISO 815) of from less than 50.
20. The graft copolymer of embodiment 14, wherein the cross-linked copolymer composition has a Shore A hardness (ISO 868) of less than 90.

21. The graft copolymer of embodiments 14 and 20, wherein the cross-linked copolymer composition has an Elongation at Break (ISO 37) of from 100 to 900.

22. The graft copolymer of embodiments 14 and 20-21, wherein the cross-linked copolymer composition has a Tensile Strength (ISO 37) of from less than 22 MPa.

23. The graft copolymer of embodiments 14 and 20-22, wherein the cross-linked copolymer composition has a Compression Set (23° C., 22 hours, 25% compression, ISO 815) of from less than 35.

24. A moisture curable sealant formed from the silane graft propylene-α-olefin copolymer any of the preceding numbered embodiments.

25. A method of forming a silane graft propylene-α-olefin copolymer of any of the preceding embodiments 1-24 comprising:
(a) providing the propylene-α-olefin; and
(b) reacting a hydrolysable vinyl silane and a free-radical initiator with the propylene-α-olefin copolymer to form a silane graft propylene-α-olefin; or
(c) reacting a maleic anhydride and a free-radical initiator with the propylene-α-olefin copolymer to form a maleic anhydride graft propylene-α-olefin copolymer, followed by contacting the maleic anhydride graft propylene-α-olefin copolymer with an amino-silane to form a silane graft propylene-α-olefin copolymer.

26. The method of embodiment 25, wherein the reacting steps of (b) or (c) take place at from 90 to 230° C.

27. The method of any of embodiments 25 and 26, wherein the reacting steps of (b) or (c) occur during melt-blending of the components.

28. The method of any of embodiments 25-27, wherein the silane graft propylene-α-olefin copolymer is contacted with water and a silanol condensation catalyst to form a cross-linked silane graft propylene-α-olefin copolymer.

29. The method of any of embodiment 28, wherein the contacting step occurs at from 20 to 85° C.

Another aspect of the invention is directed to the use of a hydrolizable silane graft propylene-α-olefin copolymer comprising a propylene-α-olefin copolymer component comprising propylene-derived units and from 5 to 35 wt %, by weight of the propylene-α-olefin copolymer, of ethylene-derived units or a C4 to C10 α-olefin-derived unit; and a hydrolysable silane component.

Yet another aspect of the invention is directed to the use of a moisture curable sealant comprising a hydrolizable silane graft propylene-α-olefin copolymer, the copolymer comprising a propylene-α-olefin copolymer component comprising propylene-derived units and from 5 to 35 wt %, by weight of the propylene-α-olefin copolymer, of ethylene-derived units or a C4 to C10 α-olefin-derived unit; and a hydrolysable silane component.

Yet another aspect of the invention is directed to the graft copolymer reaction product, in the presence of a free-radical initiator, of a propylene-α-olefin copolymer comprising propylene-derived units and from 5 to 35 wt %, by weight of the propylene-α-olefin copolymer, of ethylene-derived units or a C4 to C10 α-olefin-derived unit; and a hydrolysable silane.

Yet another aspect of the invention is directed to the graft copolymer reaction product, in the presence of a free-radical initiator, and an oil, of a propylene-α-olefin copolymer comprising propylene-derived units and from 5 to 35 wt %, by weight of the propylene-α-olefin copolymer, of ethylene-derived units or a C4 to C10 α-olefin-derived unit; and a hydrolysable silane.

In any of the preceding embodiments, the graft copolymer may comprise from 95.0 to 99.97 wt % (by weight of the of the graft copolymer) of propylene-α-olefin copolymer component and from 0.03 to 5 wt % (by weight of the of the graft copolymer) of the hydrolysable silane component.

The invention claimed is:

1. A graft copolymer composition comprising a hydrolizable silane graft propylene-α-olefin copolymer, the composition comprising:
a hydrolizable silane graft propylene-α-olefin copolymer comprising a propylene-α-olefin copolymer component and a hydrolizable silane component, and
from 0.1 to 5 wt %, based on total weight of the hydrolizable silane graft propylene-α-olefin copolymer, of at least one silanol condensation catalyst:
wherein the propylene-α-olefin copolymer component comprises propylene-derived units and from 5 to 20 wt %, by weight of the propylene-α-olefin copolymer, of ethylene-derived units or $C_4$ to $C_{10}$ α-olefin-derived units, and having:
(i) a density of from 0.850 to 0.920 g/cm$^3$;
(ii) a MWD of from 1.5 to 20;
(iii) an $H_f$ of less than or equal to 75 J/g;
(iv) a $T_m$ of from 25 to 105° C.;
(v) a triad tacticity by $^{13}$C NMR of 75% or greater;
(vi) a melt flow rate (2.16 kg, 230° C.) of from 0.2 to 100 dg/min;
(vii) a weight average molecular weight of 50,000 to 400,000; and
(viii) a number average molecular weight of 25,000 to 200,000; and
wherein the cured graft copolymer composition comprising the hydrolizable silane graft copolymer has an Elongation at Break as determined by ISO-37 (500 mm/min, 23° C.) greater than 400%;
wherein the hydrolizable silane component is derived from a vinyl silane having the following formula: YSiRR"$_2$, wherein Y is selected from vinyl terminated radicals, each R" is independently selected from hydrolizable organic radicals; and R can be an R" radical, or selected from $C_1$ to $C_{10}$ alkyl radicals (both R and R" are bound to the silicon atom); and
wherein the graft copolymer has a haze value of from less than 15%.

2. The graft copolymer composition of claim 1, wherein the propylene-α-olefin copolymer comprises from 6 to 20 wt % ethylene-derived units.

3. The graft copolymer composition of claim 1, wherein the $H_f$ of the propylene-α-olefin copolymer is less than or equal to 60 J/g.

4. The graft copolymer composition of claim 1, wherein the composition comprises from 0.03 to 5 wt % of the hydrolizable silane component, based on weight of the hydrolizable silane graft propylene-α-olefin copolymer.

5. The graft copolymer composition of claim 1, wherein the propylene-α-olefin copolymer also comprises from 0.1 to 6 wt % diene-derived units.

6. A composition consisting of:
(a) a hydrolizable silane graft propylene-α-olefin copolymer comprising propylene-derived units and from 11 to 20 wt %, by weight of the propylene-α-olefin copolymer, of ethylene-derived units or $C_4$ to $C_{10}$ α-olefin-derived units, and having:
(i) a density of from 0.850 to 0.920 g/cm$^3$;
(ii) a MWD of from 1.5 to 20;
(iii) an $H_f$ of less than or equal to 75 J/g;
(iv) a $T_m$ of from 25 to 105° C.;
(v) a triad tacticity by $^{13}$C NMR of 75% or greater;

(vi) a melt flow rate (2.16 kg, 230° C.) of from 0.2 to 100 dg/min;
(vii) a weight average molecular weight of 50,000 to 400,000;
(viii) a number average molecular weight of 25,000 to 200,000; and
(ix) a hydrolizable silane component;
(b) a non-grafted polymer selected from propylene homopolymers, propylene random copolymers, impact copolymers, plastomers, polyethylenes, and combinations thereof;
(c) oil and filter; and
(d) from 0.1 to 5 wt %, based on total weight of the hydrolizable silane graft propylene-α-olefin copolymer, of at least one silanol condensation catalyst;
wherein the cured composition has an Elongation at Break as determined by ISO-37 (500 mm/min, 23° C.) greater than 400%;
wherein the hydrolizable silane component is derived from an amino silane having the following formula: $YHN(CH_2)_nSiRR''_2$, wherein N is a nitrogen atom, n is from 1 to 20 and wherein Y radical is either hydrogen or one alkyl radical $C_1$ to $C_{20}$ alkyl radical terminated by $—NH_2$; R" is selected from hydrolizable organic radicals, and R can be an alkyl group or a R" radical, or selected from $C_1$ to $C_{10}$ alkyl radicals; and
wherein the raft copolymer has a haze value of from less than 15%.

7. The composition of claim 6, wherein the composition includes from 1 to 60 wt %, by weight of the composition, of the non-grafted polymer.

8. The composition of claim 7, wherein the composition includes from 5 to 60 wt % of the oil.

9. A moisture curable sealant formed from the graft copolymer composition of claim 1.

10. The composition of claim 6, wherein the propylene-α-olefin copolymer also comprises from 0.1 to 6 wt % diene-derived units.

11. The graft copolymer composition of claim 1, wherein the composition comprises from 0.1 to 1 wt %, based on total weight of the hydrolizable silane graft propylene-α-olefin copolymer, of at least one silanol condensation catalyst.

12. The composition of claim 6, wherein the composition comprises from 0.1 to 1 wt %, based on total weight of the hydrolizable silane graft propylene-α-olefin copolymer, of at least one silanol condensation catalyst.

13. The composition of claim 1, wherein the graft copolymer composition is cross-linked upon exposure to a liquid or vapor water.

14. The composition of claim 6, wherein the graft copolymer composition is cross-linked upon exposure to a liquid or vapor water.

* * * * *